United States Patent [19]
von Gaisberg et al.

[11] Patent Number: 5,233,162
[45] Date of Patent: Aug. 3, 1993

[54] ELECTRIC CIGAR LIGHTER WITH A BIMETALLIC SNAP-ACTION DISC FOR OVERLOAD PROTECTION

[75] Inventors: Alexander von Gaisberg, Beilstein; Alexander Fischer, Bad Homburg, both of Fed. Rep. of Germany

[73] Assignee: Schoeller & Co. Elektrotechnische Fabrik GmbH & Co., Frankfurt, Fed. Rep. of Germany

[21] Appl. No.: 588,625

[22] Filed: Sep. 26, 1990

[30] Foreign Application Priority Data

Sep. 29, 1989 [DE] Fed. Rep. of Germany ....... 3932604

[51] Int. Cl.$^5$ ............................ H05B 1/02; F23Q 7/00
[52] U.S. Cl. .................................... 219/265; 219/508; 219/512
[58] Field of Search .............................. 219/260–270, 219/508, 512

[56] References Cited

U.S. PATENT DOCUMENTS

| | | | |
|---|---|---|---|
| 2,248,017 | 7/1941 | Cohen | 219/265 |
| 2,269,008 | 1/1942 | Cohen | |
| 2,292,408 | 8/1942 | Spenger | 219/262 |
| 2,637,799 | 5/1953 | Wood | 219/265 |
| 3,238,353 | 3/1966 | Lybrook | 219/265 |
| 3,330,937 | 7/1967 | Horwitt | 219/265 |
| 4,190,763 | 2/1980 | Seibel et al. | 219/265 |
| 4,207,455 | 6/1980 | Horwitt et al. | 219/265 |
| 4,449,036 | 5/1984 | Seibel et al. | 219/265 |

FOREIGN PATENT DOCUMENTS

| | | |
|---|---|---|
| 1632593 | 12/1970 | Fed. Rep. of Germany . |
| 2755620 | 7/1979 | Fed. Rep. of Germany ...... 219/265 |
| 1541896 | 10/1967 | France . |

Primary Examiner—Anthony Bartis
Attorney, Agent, or Firm—Nikaido, Marmelstein, Murray & Oram

[57] ABSTRACT

An electric lighter for a vehicle includes a lighter plug insertable into a dashboard socket having a bimetallic yoke engageable with an end of the plug for energizing the glow coil of the plug. An overload protective device is disposed in the socket and comprises a bimetallic snap-action disc disposed immediately below the yoke and connected electrically in series therewith. The snap-action disc has a first shape in its operating condition where it completes the circuit to the glow coil through the yoke and assumes a second shape when it snaps to its switch-off position in response to an overload condition to open the circuit to the glow coil. The snap-action disc remains in its switch-off position after cooling and must be manually reset to its operating position to restore operability of the lighter by the engagement of a manually actuated reset device associated with the socket with a peripheral portion of the snap-action disc. The resetting can be performed by having the socket axially movable against the bias of a spring in an illumination sleeve, so that resetting takes place when the lighter plug is inserted into the socket.

11 Claims, 5 Drawing Sheets

ELECTRIC CIGAR LIGHTER WITH A BIMETALLIC SNAP-ACTION DISC FOR OVERLOAD PROTECTION

BACKGROUND OF THE INVENTION

The invention relates to an electric cigar or cigarette lighter for installation in the dashboard of a motor vehicle such as an automobile, the lighter including an overload protective device.

A cigar lighter of this kind is known from German Offenlegungschrift No. 2,755,620. The apparatus shown therein includes a socket, which can for example, be arranged in the dashboard of a vehicle, and a lighter plug which is inserted into the socket. In the vehicle, the socket of the cigar lighter furthermore serves as an interface between an on-board electrical system of the automobile and accessory devices, e.g. lamps or electrically driven tools, which can be connected to this socket with the aid of accessory plugs.

Cigar lighters of the type shown in the above-mentioned document contain a normal-duty switch-off device, which switches off a current flowing through a glow coil in a glow-coil dish of the lighter plug when a desired temperature of the glow coil is reached.

The cigar lighter known from the above-mentioned prior art reference furthermore contains an overload protective device which, in the case of overheating, which can be caused for example by a failure of the normal-duty switch-off device, brings about an interruption of the electric circuit. The overload protective device also reacts to an excessively high electric current, e.g. a short-circuit current. This is because the overload protective device contains a bimetallic snap-action disc which changes its shape both in the case of heat supply from an external source and in the case of internal heating caused by its own electrical resistance, and thereby interrupts the current circuit.

The overload protective device described above can be arranged in the lighter plug or in the socket. When arranged in the connection to an accessory device, an excess current is detected and switched off.

The overload protective device of the aforementioned known cigar lighter contains a bimetallic disc which has a temperature dependent shape characteristic as illustrated in FIG. 1. Due to a mechanical prestress inherent in the bimetallic disc, the bimetallic disc retains a shape I as the temperature T increases and, after reaching a defined switch-off temperature $T_A$ snaps over into a second stable condition, namely a shape II. After falling below a reset temperature $T_R$ as it cools, the bimetallic disc changes its shape suddenly again, i.e. it reassumes the shape I.

Since the bimetallic snap-action disc is inserted as a switching element into the current circuit, the current circuit is opened in the case of an overload occurring as soon as the switch-off temperature $T_A$ is exceeded and switched on again when the bimetallic snap-action disc has cooled to the reset temperature $T_R$. An overload is thus not permanently switched off, but renewed heating up occurs at time intervals. In the printed publication mentioned, the overload protective device is designed for this switching behavior in such a way that the temperatures brought about during the switch-on times are not so high that a fire could be caused. Nevertheless, it can be undesired or dangerous to connect the current several times to a current consuming device; at the very least, the battery of the on-board electrical system is discharged in an undesirable manner.

SUMMARY OF THE INVENTION

Starting from the abovementioned prior art and avoiding the disadvantages mentioned in the foregoing, the object of the present invention is to provide an overload protective device for an electric cigar or cigarette lighter in which, after the lighter has been initially switched off due to an overload, an automatic switching on again of the overload is prevented for a relatively prolonged period of time.

This object is achieved in the case of a cigar lighter according to the invention as described above by provision of a bimetallic snap-action disc arranged in the electric current circuit which, upon cooling, does not automatically return to its operating position.

According to the invention, the overload protective device has a bimetallic disc which has a shape dependent upon temperature in such a way that when the temperature of the bimetallic disc rises, the disc changes its state abruptly from a first, stable state designated as shape I to a second, stable state designated as shape II, and as it cools, the bimetallic snap-action disc retains this shape II. The bimetallic disc can only be brought back into the initial shape I by use of an external force, i.e. by mechanical resetting. The overload protective device according to the invention has the advantage that, after an overload has been switched off, automatic switching on again does not occur. As explained in greater detail below, the cigar lighter can be designed in such a way that the resetting can only be carried out with the aid of a tool. However, it can also be designed in different ways, such that resetting occurs either by deliberate action or such that resetting occurs by routine, non-deliberate action, depending on the design chosen, when the lighter plug or an accessory plug is inserted into the socket. The overload protective device can furthermore be arranged in the socket or in the lighter plug.

According to a first embodiment of the socket according to the invention, which can be produced with relatively little expenditure, the bimetallic snap-action disc is arranged directly below a bimetallic yoke provided for the normal switching off and is simultaneously secured with the latter in the base region of the socket.

According to a second embodiment of the invention, the bimetallic snap-action disc is arranged in an enclosed fashion in the region of the base of the socket, so as to be better protected from dirt and manipulation. Both embodiments of the socket require a resetting of the bimetallic snap-action disc with the aid of a relatively simple tool.

According to a particularly advantageous embodiment, a socket with an illumination sleeve is provided, it being possible to achieve resetting of the bimetallic snap-action disc without a tool with the aid of a socket displaceable against a spring force within the illumination sleeve. The resetting mechanism operates both when a lighter plug is inserted and when an accessory plug is inserted.

Finally, another advantageous embodiment of a lighter plug contains an overload protective device according to the invention which can be reset without a tool simply by pressing in a lighter actuation knob of the lighter to a particularly great depth. A lighter plug of this kind can be used in conjunction with any commercially available socket.

BRIEF DESCRIPTION OF THE DRAWINGS

A detailed description of the invention is given with reference to illustrative embodiments represented in the drawing, in which.

DETAILED DESCRIPTION OF THE PREFERRED EMBODIMENT

Figure 1:
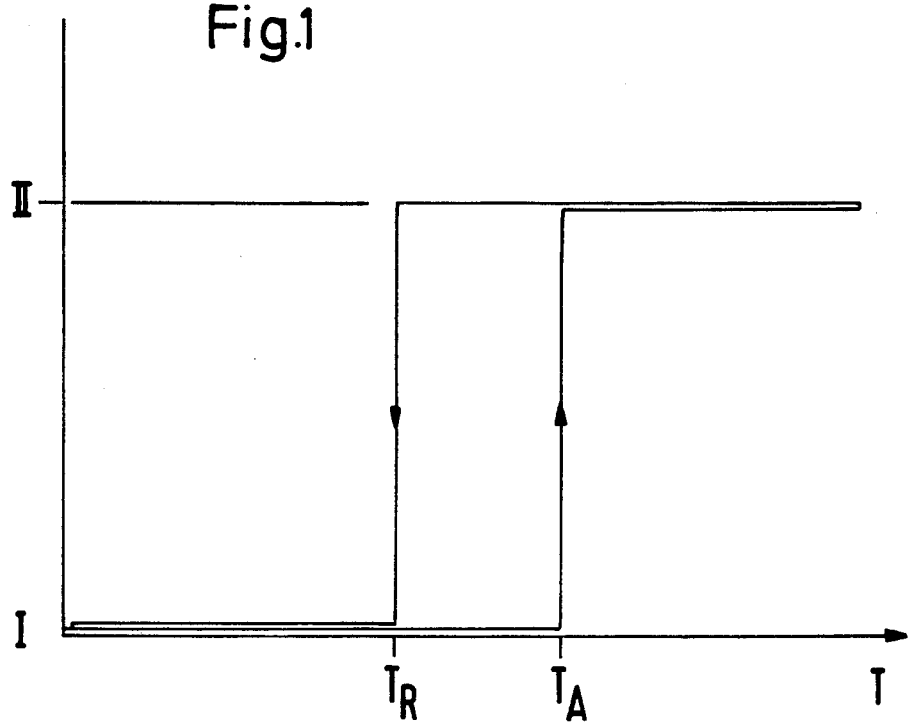
FIG. 1 shows a curve representing variation of a shape with respect to a temperature of a bimetallic snap-action disc which is used in an electric cigar lighter with an overload protective device according to the prior art.
Figure 2:
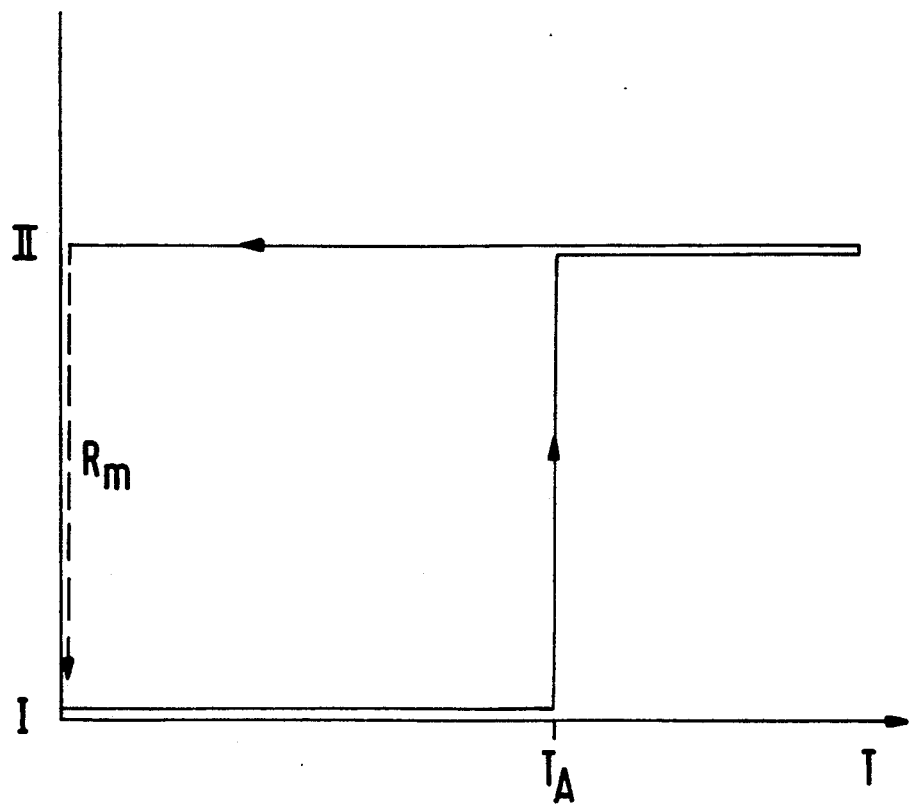
FIG. 2 shows a curve representing variation of shape with respect to temperature of a bimetallic snap-action disc which is used in the cigar lighter according to the invention.
Figure 3:
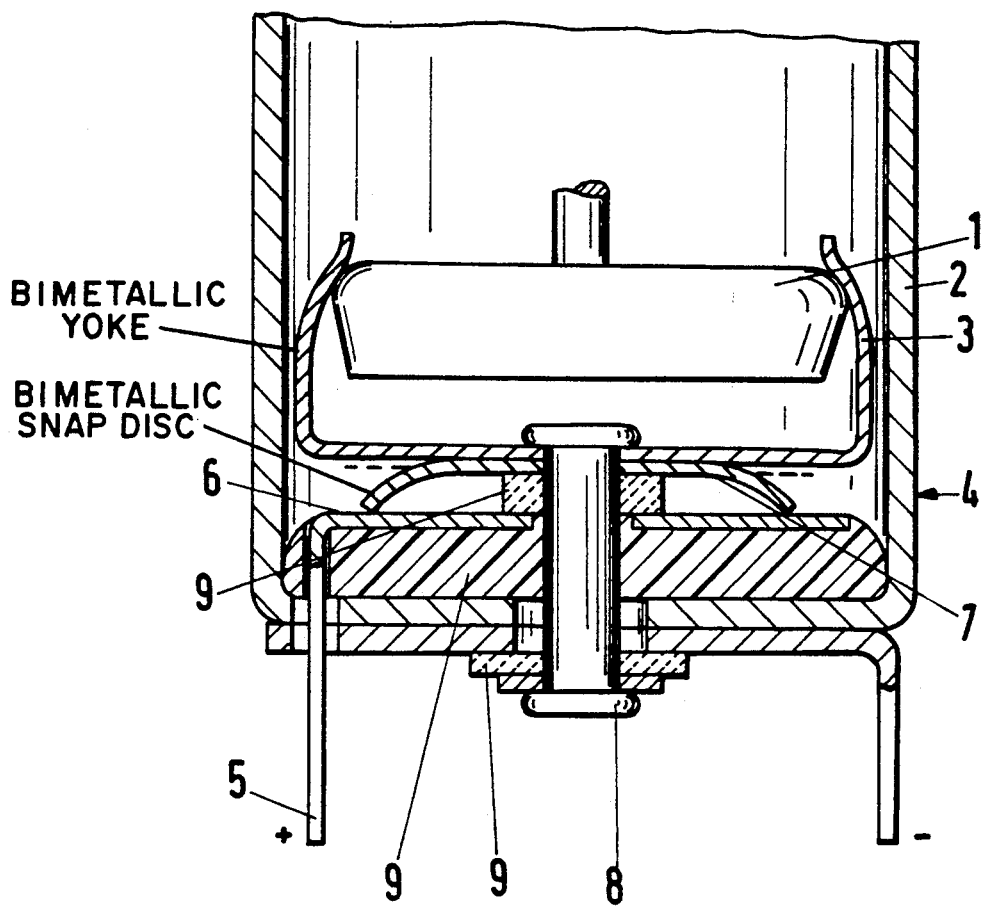
FIG. 3 is a side sectional view of a socket with an overload protective device according to the invention.

FIG. 3 shows a section through an electric cigar or cigarette lighter which is only partially illustrated. Here, a lighter plug is indicated only by its glow-coil dish 1, which is held within a metallic socket 2 by a bimetallic yoke 3. FIG. 2 shows a diagram representing variation of the shape of a bimetallic snap-action disc 7 shown in FIG. 3, which is discussed further hereunder.

The bimetallic yoke 3 forms a normal switch-off device and leads the positive pole of an on-board electrical system to the lighter plug. The negative pole is led via the socket 2 to the lighter plug in a known manner. The positive pole is led via an overload protective device 4 from a positive pole connection 5, via a positive contact 6 and the bimetallic snap-action disc 7 to the bimetallic yoke 3. The bimetallic snap-action disc 7 is in an operating position which is represented by solid lines in FIG. 3, and this operating position corresponds to shape I of FIG. 2. A switch-off position of the bimetallic snap-action disc 7 (corresponding to the shape II of FIG. 2) is indicated in FIG. 3 by dashed lines. The reference numeral 8 denotes a fastening rivet. A plurality of insulating parts are provided and are indicated by the reference numeral 9.

Figure 4:
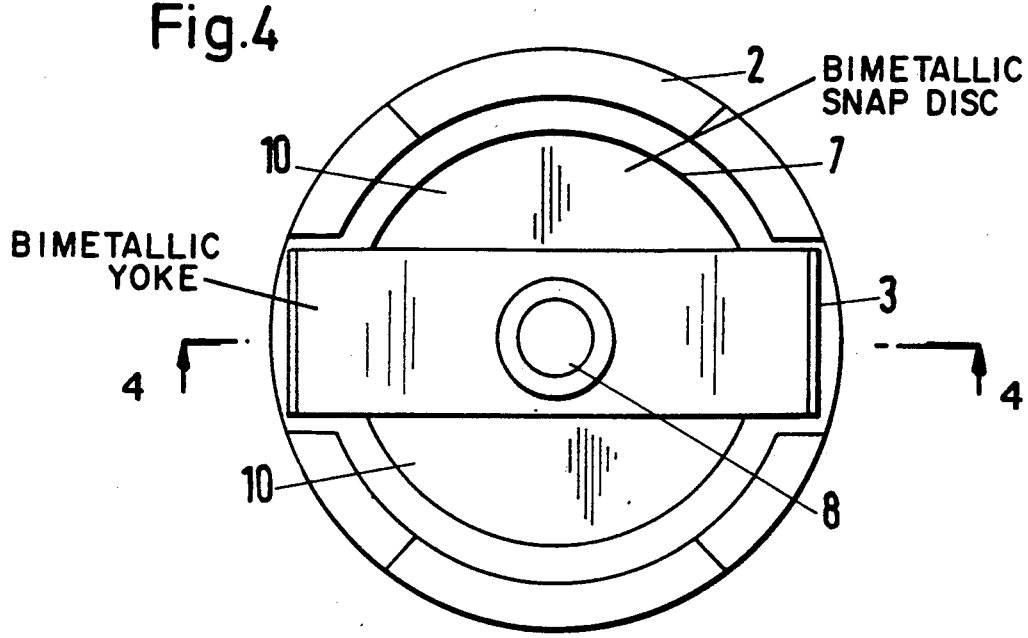
FIG. 4 is a top plan view of a socket with an overload protective device according to the invention.

FIG. 4 shows a view into the empty socket 2, i.e., without a lighter plug. Visible in addition to the bimetallic yoke 3 and the fastening rivet 8 are surfaces 10 of the bimetallic snap-action disc 7 which are accessible to a tool for resetting of the bimetallic snap-action disc 7.

Figure 5:
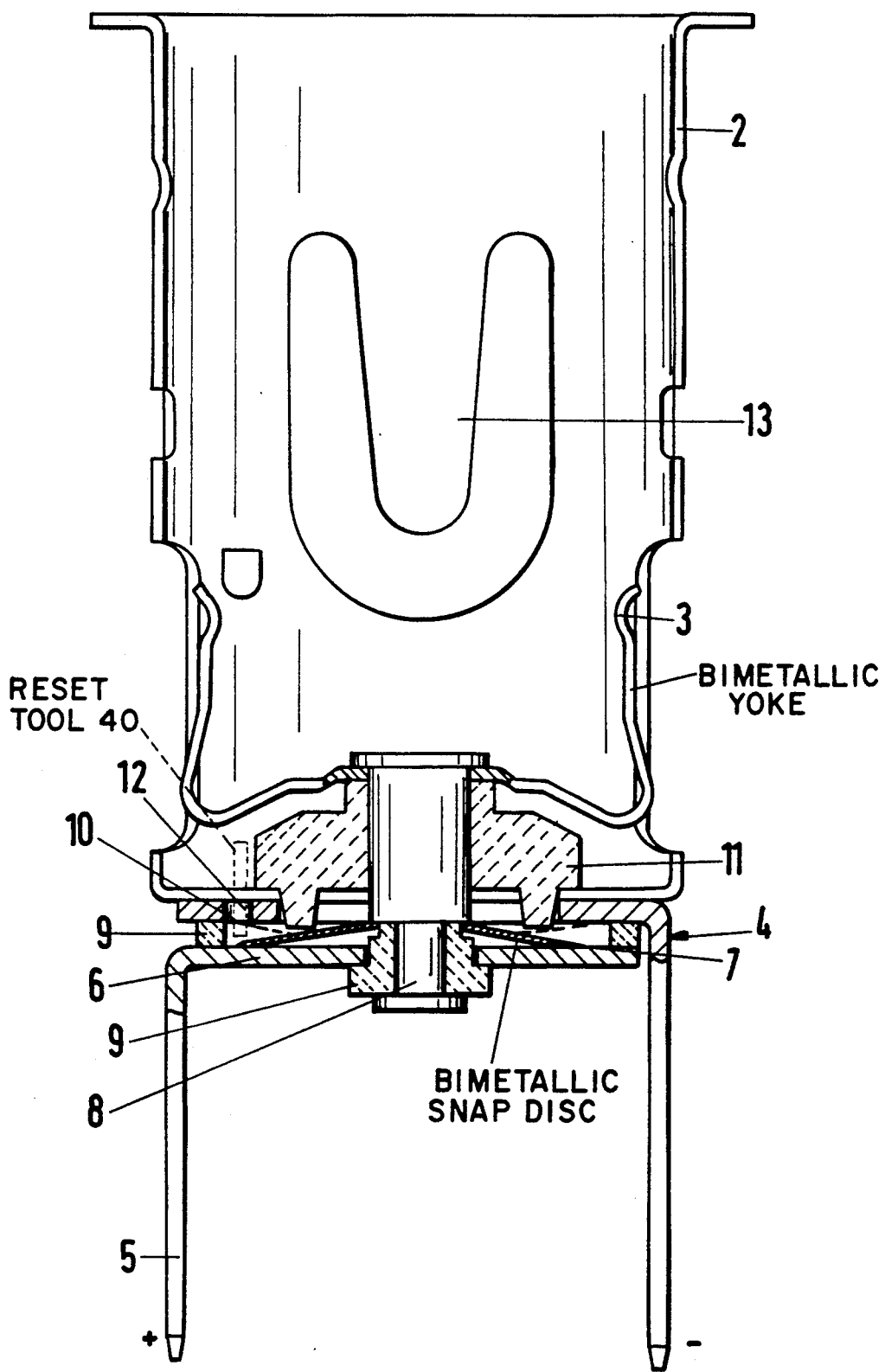
FIG. 5 shows a socket with an enclosed overload protective device.

FIG. 5 shows a second embodiment of a socket 2 with an overload protective device 4'. Corresponding components are in each case provided with the same reference numerals as those in FIGS. 3 and 4 of the drawings. In contrast to the arrangement according to FIG. 3, the arrangement illustrated in FIG. 5 contains a molding 11, by which the bimetallic snap-action disc 7 is enclosed on one side. Provided in the base region of the socket 2 is at least one resetting opening 12, through which it is possible to press on an accessible portion of the surface 10 of the bimetallic snap-action disc 7 with a suitable tool 40 e.g. a pencil, in order to reset the bimetallic snap-action disc 7 to its operating position. Also visible on the socket 2 are catch springs 13, which serve for latching of the lighter plug.

Figure 6A:
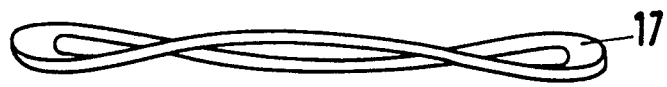
FIGS. 6A and 6B show a washer and a socket with an illumination sleeve and an overload protective device resettable without a tool according to the invention.
Figure 6B:
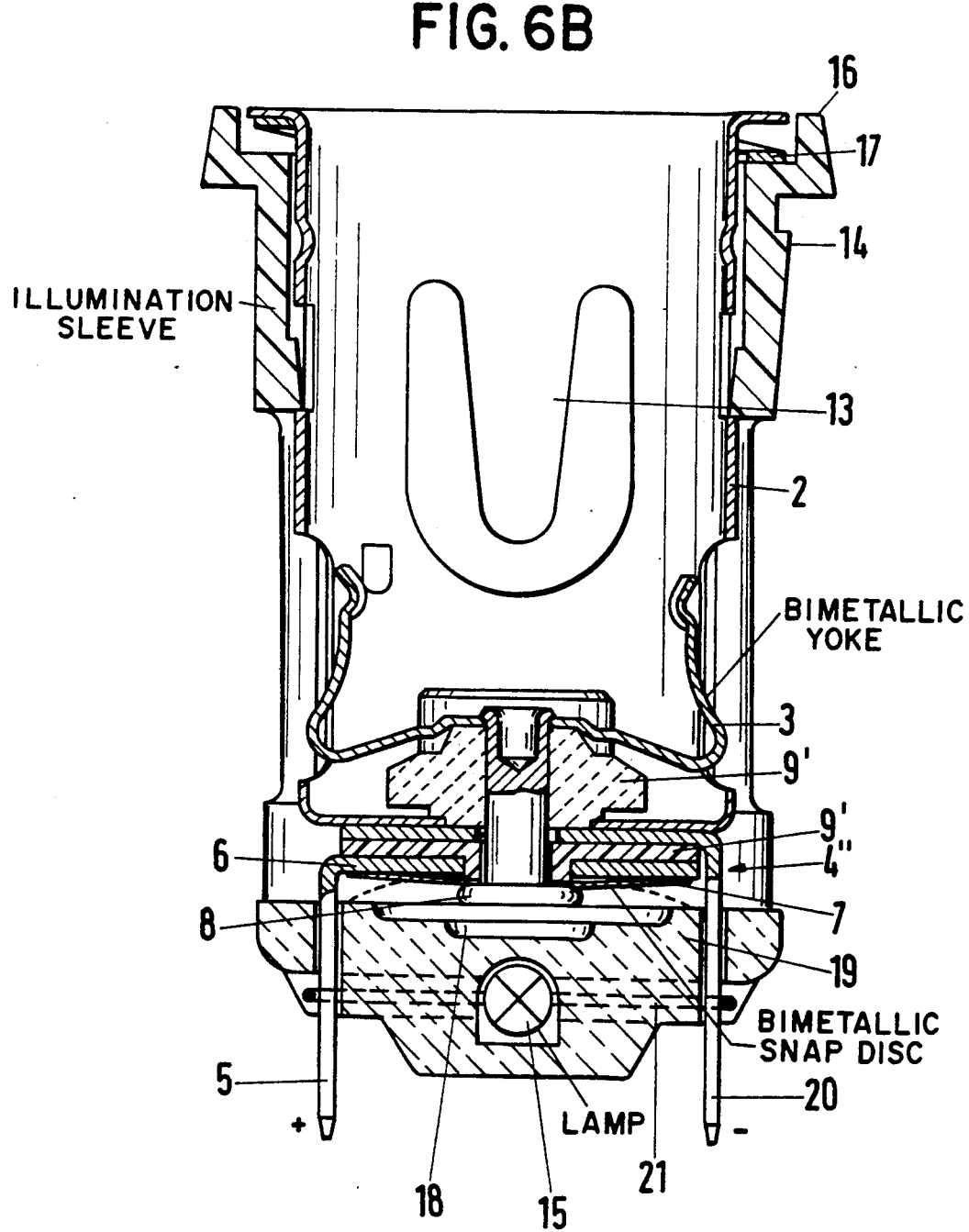

FIG. 6B shows a section through a metallic socket 2 which is surrounded by a nonmetallic illumination sleeve 14, having an overload protective device 4''. The illumination sleeve 14 conducts light from an incandescent lamp 15, which is arranged in the base of the illumination sleeve 14, to an illumination ring 16 which, when the cigar lighter is arranged in a dashboard, is visible there. In the operating position illustrated, the bimetallic snap-action disc 7 closes a current path from the positive pole connection 5, via the positive contact 6 and rivet 8, to the bimetallic yoke 3. In the case of overloading, the bimetallic snap-action disc 7 snaps against the base of the illumination sleeve 14 and thus interrupts the electrical connection between the bimetallic snap-action disc 7 and the positive contact 5.

For the purpose of resetting the bimetallic snap-action disc 7, axial pressure displaces the socket 2 within the illumination sleeve 14 towards the base of the illumination sleeve 14 when a plug, e.g. the lighter plug, is inserted. The spring force of a corrugated washer 17 which constitutes a spring means must be overcome during this procedure. For the purpose of clarification, the corrugated washer 17 is also illustrated separately in FIG. 6A. In the resetting procedure, the entire socket 2 is displaced within the illumination sleeve 14 until the rivet 8 rests in a depression 18 in the base of the illumination sleeve 14. In the process, an upward pressure is exerted on an edge region of the bimetallic snap-action disc 7 via an edge surface of an illumination sleeve base 19 in the plane of the base of the illumination sleeve 14, the resetting thereby being effected. The rivet 8 fastens the illumination sleeve base 19 and insulating parts 9'. To ensure that the socket 2 can be moved axially within the illumination sleeve 14, the positive pole connection 5 and a negative pole connection 20, which are firmly connected to the socket 2, must be able to slide within the base 19 of the illumination sleeve 14. Connections 21 for the incandescent lamp 15 must also be of correspondingly flexible design or alternatively, the connections 21 must, for example, be able to move in a groove.

If a corrugated washer 17 of low spring force (i.e., having a low spring constant) is chosen, the socket 2 is displaced within the illumination sleeve 14 each time a lighter plug is inserted, due to the force to be applied which is required in order to latch the lighter plug, and a resetting of the bimetallic snap-action disc 7 is thereby brought about.

If such resetting of the snap-action disc 7, brought about non-deliberately by the user upon re-inserting of the lighter plug, is not desired, a corrugated washer 17 can be chosen whose spring force (i.e., the force resulting from its spring constant) is clearly greater than the force ordinarily required for inserting a plug and which is also greater than the force required for switching on the glow coil in a lighter plug. Resetting of the bimetallic snap-action disc 7 then requires a particularly high pressure on a lighter plug located in the socket 2. This required high pressure would require a deliberate effort.

Figure 7:
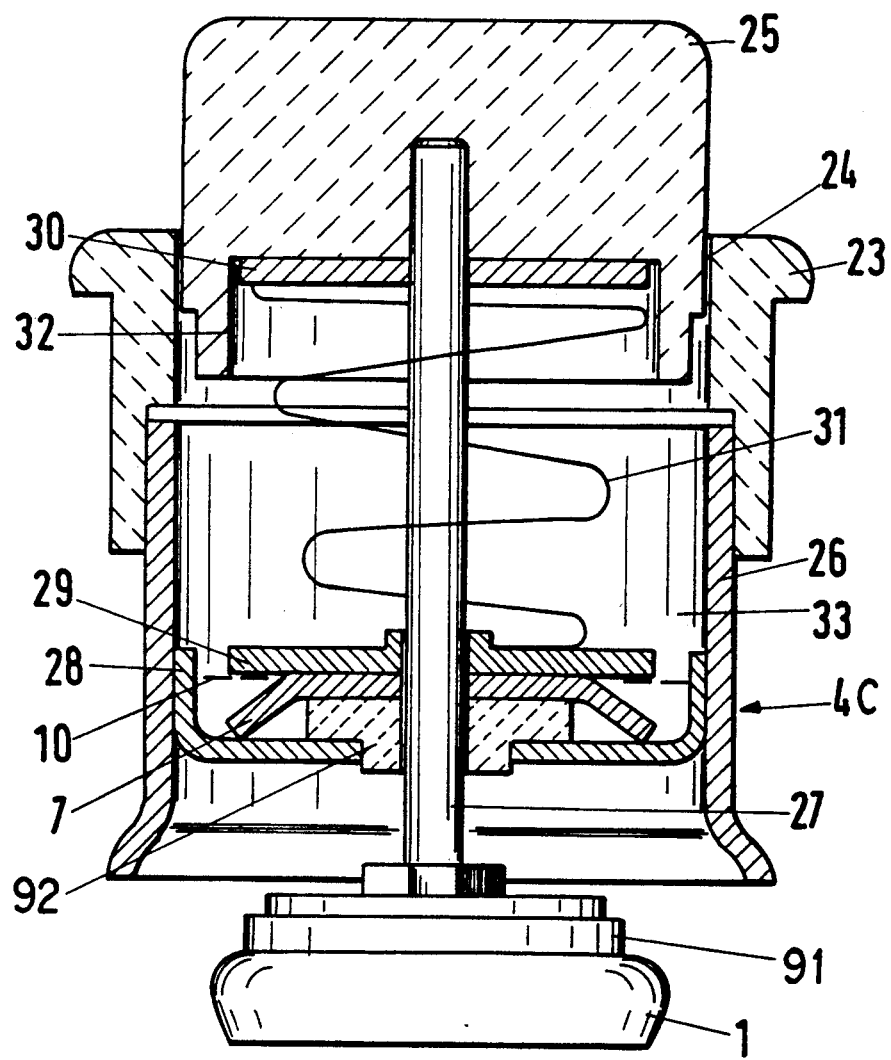
FIG. 7 shows a lighter plug with an overload protective device according to the invention, which is resettable without a tool.

FIG. 7 shows a lighter plug 22 which contains an overload protective device 4C. The lighter plug 22 has an electrically insulated grip 23 with a bore 24 in which an actuating button 25 slides. Associated with the grip 23 is a metallic hollow cylindrical part 26, which establishes a contact with a negative pole in the lighter plug 22 (the negative pole is not shown in FIG. 7).

The actuating button 25 is connected mechanically to the glow-coil dish 1 via a pin 27. The metallic glow-coil dish 1 is electrically insulated from the metallic pin 27 with the aid of a first insulating part 91. Within the glow-coil dish 1, a glow-coil (not shown) is connected by one end thereof to the glow-coil dish 1 and by the other end thereof to the pin 27. The glow-coil dish 1 is connected in a socket to the positive pole.

The overload protective device 4C disconnects the negative pole, and comprises a cup-shaped metallic negative contact 28 which is surrounded by the hollow cylindrical part 26 and is firmly connected to the latter. In the base of the cup-shaped negative contact 28, the negative contact 28 has a central bore through which the pin 27 passes. The pin 27 is electrically insulated by a second insulating part 92. Arranged above the second insulating part 92 is a bimetallic snap-action disc 7 which, in a switched-on position as shown, touches the cup-shaped negative contact 28. The bimetallic snap-action disc 7 is provided with a bore for the passage of the pin 27, and is secured on a metallic travel washer 29, which likewise has a bore. A metal washer 30 is arranged on the underside of the actuating button 25 and connected in electrically conducting manner to the pin 27 which passes therethrough. Arranged between the metal washer 30 and the travel washer 29 is a conical compression spring 31. The negative pole is thus electrically connected to the glow-coil from the hollow cylindrical part 26 via the negative contact 28, the bimetallic snap-action disc 7, the travel washer 29, the compression spring 31, the metal washer 30, and the pin 27.

For the normal actuation of the electric lighter, the actuating button 25 is pressed into the grip 23 against the force of the compression spring 31 until the glow-coil dish 1 latches in the socket (not shown).

If an overload occurs, the bimetallic disc 7 snaps into the switch-off position shown in dashed lines and interrupts the negative current path. In order to reset the overload protective device 4C' after a switch-off, the lighter plug 22 is removed from the socket and the cooled bimetallic snap-action disc 7 is reset to its switch-on position by pressing the actuating button 25 in deeply. When the actuating button 25 is pressed in deeply, the windings of the conical compression spring 31 come to rest next to one another in a coil shape, with the result that the compression spring 31 then has only the height of the thickness of the spring wire. On the underside of the actuating button 25, at the edge thereof, there is an annular formation 32 which, in the case where the actuating button 25 has been pressed in deeply enough, reaches through an intermediate space 33 between the travel washer 29 and the negative contact 28 and presses on the edge of the bimetallic snap-action disc 7, as a result of which the latter snaps over to its operating position.

The polarity indicated in each case relates to the customary design of the on-board electrical system of a vehicle, the negative pole being connected to a ground. The opposite polarity can of course also be chosen.

While a preferred embodiment has been described and illustrated, it will be understood that the present invention is not limited thereto but may be otherwise embodied within the scope of the following claims.

What is claimed is:

1. An electric lighter which is for installation in a dashboard of a motor vehicle, said electric lighter comprising:
   a dashboard socket having a bimetallic electrical contact yoke,
   a lighter plug insertable into said socket, thereby engaging an end of said lighter plug with said bimetallic electrical contact yoke, said lighter plug having a glow coil energized upon said engagement of said contact yoke; an overload protective means disposed in said socket for breaking the electrical current path to said glow coil in response to an overload condition, said overload protective means including a bimetallic snap-action disc having an operating position and a switch-off position, said bimetallic snap-action disc in said socket being disposed immediately below said bimetallic yoke, wherein said bimetallic yoke is operable for the switching off of current to said glow coil when no overload condition exists by enabling disconnection thereof with said end of said lighter plug, wherein said bimetallic snap action disc, in conjunction with a positive contact, forms the overload protective device, said bimetallic snap-action disc in said operating position having a first shape and in said switch-off position having a second shape, and said bimetallic snap-action disc being arranged in said electrical current path such that said bimetallic snap-action disc conducts current between said socket and said glow plug when in said operating position and when in said switch-off position opens said electrical current path, and upon cooling of said bimetallic snap-action disc, said bimetallic snap-action disc does not return automatically to said operating position in which said bimetallic snap-action disc has said first shape, said bimetallic snap-action disc being manually changeable from said switch-off position to said operating position, and having a peripheral portion thereof arranged to be engaged by a manually actuated resetting means associated with said socket for returning the disc to the operating position.

2. An electric lighter according to claim 1, wherein said bimetallic snap-action disc in said socket is arranged at a certain distance below the bimetallic snap-action disc determined by the change in shape of the bimettallic snap-action disc.

3. An electric lighter according to claim 2, wherein a molding for an enclosure of the overload protective device is arranged between the bimetallic yoke and the bimetallic snap-action disc.

4. An electric lighter according to claim 1, further comprising a fixedly positioned illumination sleeve, with said socket axially movably mounted therein, said resetting means supported by said socket for movement therewith for resetting said bimetallic snap-action disc from said switch-off position to said operating position in response to axial displacement of the socket in the illumination sleeve, and resilient means for applying a spring force urging said socket in an axial direction relative to said illumination sleeve wherein said socket is axially displaceable in said illumination sleeve, and wherein said resetting means can reset said bimetallic snap-action disc to said operating position from said switch-off position by axial displacement of said socket in said illumination sleeve against a spring force exerted by said resilient means.

5. An electric lighter as claimed in claim 1, wherein said overload condition can be caused by an overload current flowing in said electrical current path.

6. An electric lighter according to claim 1, wherein said overload condition can be caused by an excess temperature occurring in said bimetallic snap-action disc.

7. An electric lighter as claimed in claim 1, wherein said overload condition can be caused by one of an overload current in said electrical current path and an excess temperature of said bimetallic snap-action disc.

8. Electric cigar lighter according to claim 1, wherein the socket is arranged in axially displaceable fashion in an illumination sleeve fixedly mounted to the dashboard, and said means are provided for resetting a bimetallic snap-action disc in the switch-off position is operable by axial displacement of the socket in the illumination sleeve against a spring force, said means being associated with said socket, and moved therewith.

9. An electric lighter as claimed in claim 1, further comprising an illumination sleeve which axially receives said socket, wherein said socket is coaxially disposed and axially movable therewithin, and resilient means for axially biasing said socket in a predetermined direction relative to said illumination sleeve thereby biasing said socket in an axially outward direction, in a normal position.

10. An electric lighter as claimed in claim 9, further wherein said comprising resetting means is associated with said socket and said illumination sleeve, and is axially movable with said socket, for resetting said bimetallic snap-action disc from said switch-off position to said operating position, said resetting means upon actuation resetting said bimetallic snap-action disc to said operating position from said switch-off position by axial displacement of said socket in said illumination sleeve.

11. An electric lighter as claimed in claim 1, further comprising an illumination sleeve for axially receiving said socket, said socket being coaxially disposed and axially displaceable therein and comprising said resetting mean, and resilient means for applying a spring force urging said socket in an axial direction relative to said illumination sleeve, wherein axial displacement of said socket in a resetting direction is resisted by the spring force exerted by said resilient means.

* * * * *